United States Patent [19]

Iwasaki

[11] 4,403,515
[45] Sep. 13, 1983

[54] POSITION SENSOR

[75] Inventor: Shinichiro Iwasaki, Auburn Heights, Mich.

[73] Assignee: Aisin Seiki Company, Limited, Kariya, Japan

[21] Appl. No.: 371,980

[22] Filed: Apr. 26, 1982

Related U.S. Application Data

[63] Continuation of Ser. No. 182,662, Aug. 29, 1980, abandoned.

[51] Int. Cl.³ .............................................. G01L 1/04
[52] U.S. Cl. .............................. 73/862.38; 73/517 R; 324/207
[58] Field of Search ............... 73/518, 862.38, 517 R; 336/30, 110; 324/207, 208

[56] References Cited

U.S. PATENT DOCUMENTS 3,958,203  5/1976  Bernin ................................. 336/110
4,140,971  2/1979  Blincoe ................................ 324/208

FOREIGN PATENT DOCUMENTS 909023  10/1962  United Kingdom ............... 324/207

Primary Examiner—James J. Gill
Attorney, Agent, or Firm—Oblon, Fisher, Spivak, McClelland & Maier

[57] ABSTRACT

A position sensor for detecting a displacement of an object, comprising a movable member coupled to the object, a permanent magnet connected to the movable member, and a magnetically soft member surrounded by an electrical coil secured adjacent to a range of movement of the magnet. Voltage pulses are applied to one end of the electrical coil, the other end of which is connected in series with the resistor. For each pulse applied to the coil, a voltage drop across the resistor is detected and a time lag between the leading edge of the applied pulse and the corresponding voltage drop across the resistor is measured by a processing circuit which produces an analog voltage or a digital code indicative of the time lag. A displacement of the object produces a change in magnetic field at the magnetically soft member which results in a corresponding variation in the above-noted time lag, which is therefore indicative of the displacement of the object.

10 Claims, 34 Drawing Figures

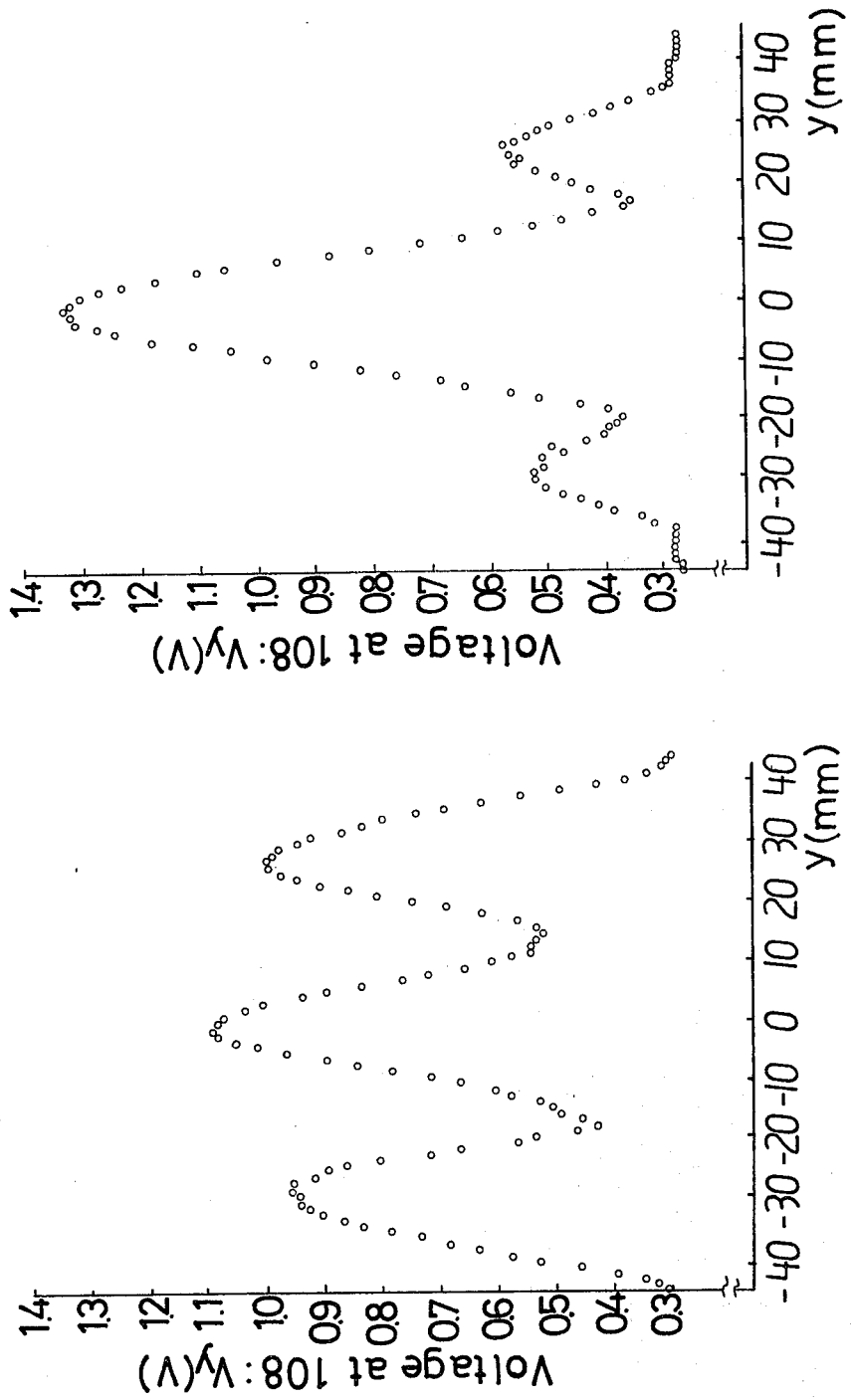

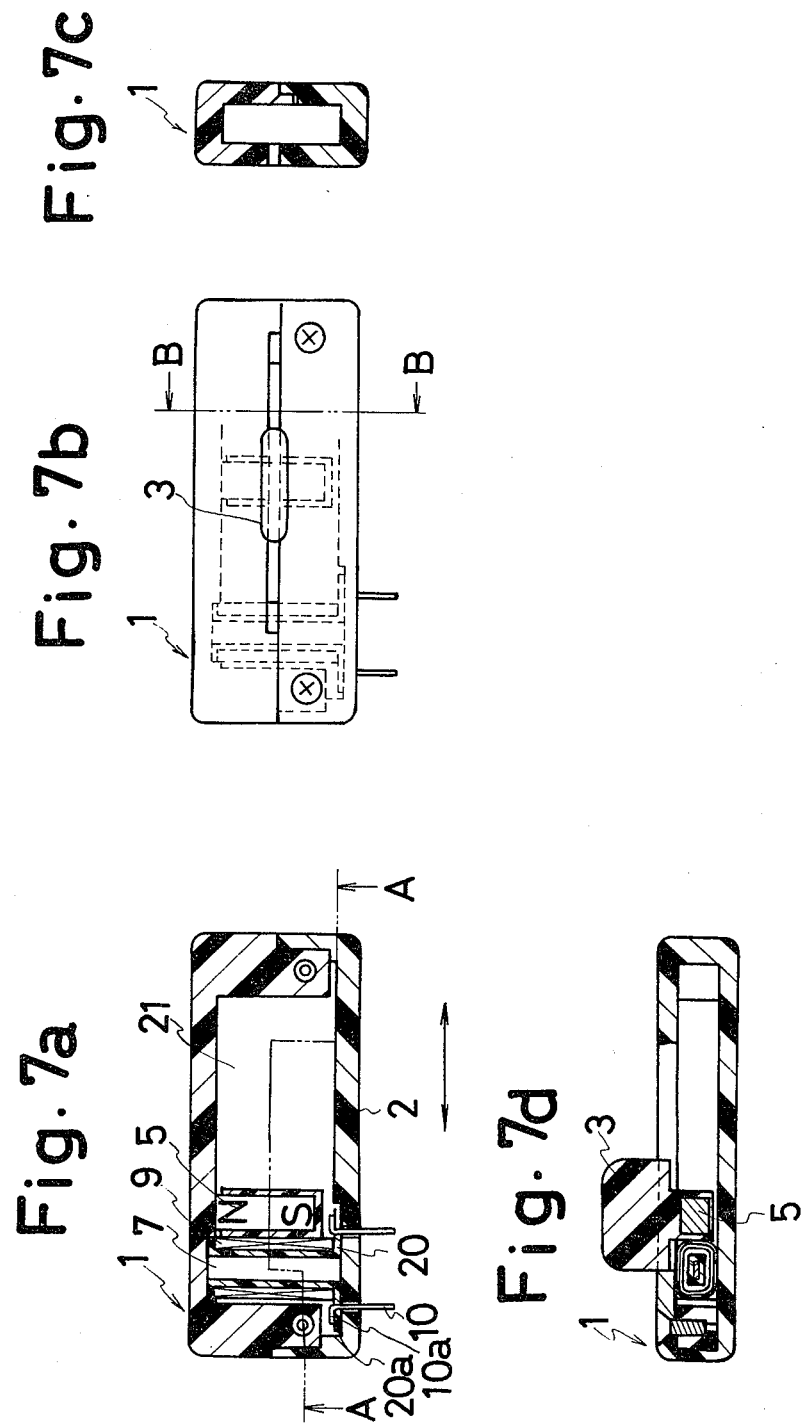

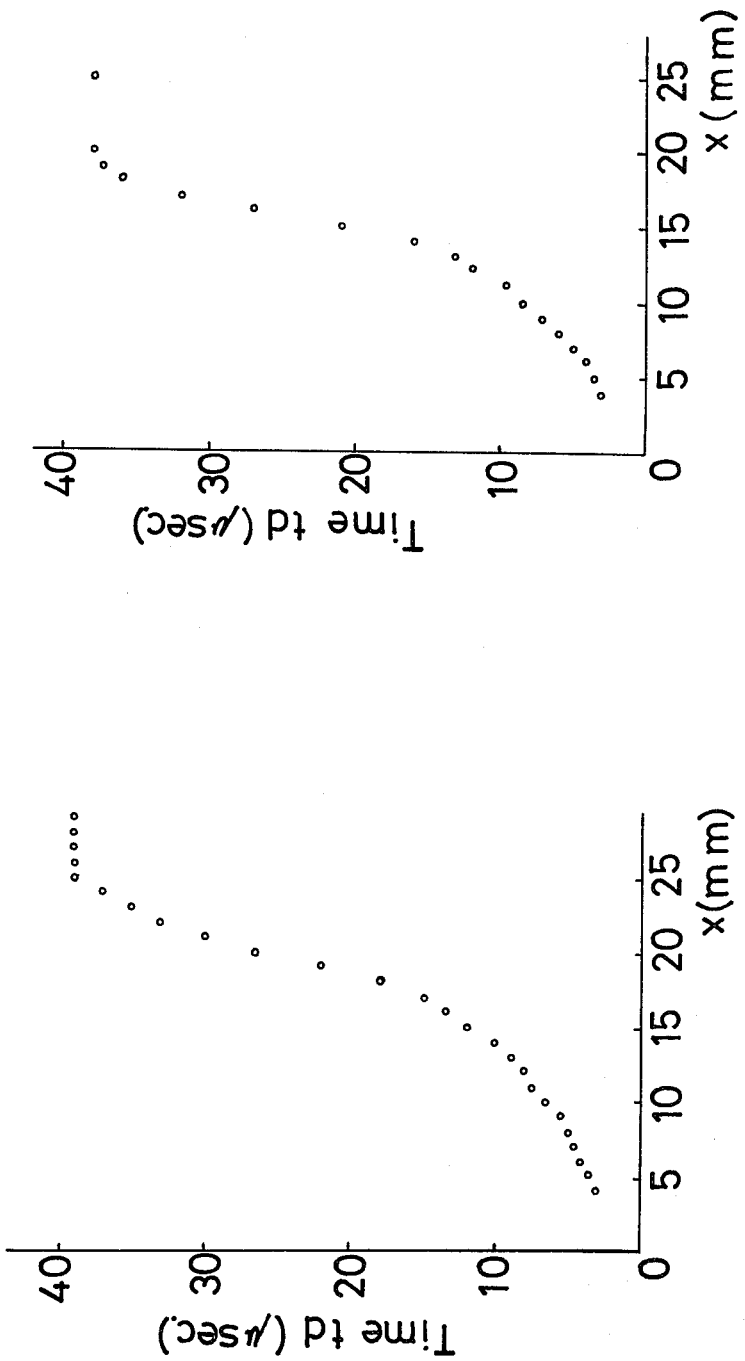

POSITION SENSOR

This is a continuation of application Ser. No. 182,662, filed Aug. 29, 1980, now abandoned.

BACKGROUND OF THE INVENTION

1. Field of the Invention

The invention relates to a position sensor for converting a displacement of a movable member into an electrical signal.

2. Description of the Prior Art

A conventional position sensor is equipped with a potentiometer in which a slider is usually connected with a movable member. In this type of position sensor, the movable member is displaced in response to an external force applied thereto and the potentiometer indicates an analog voltage substantially proportional to the displacement of the movable member. However, it has been experienced that the abrasion resistance of the thin film resistor in the potentiometer is high so that the level of an output voltage with respect to the slider position is not stabilized and the movable member is not brought into constant pressure contact with the slider so that it is not possible to maintain a contact between the slider and the thin film resistor upon subjection to vibration or shock.

SUMMARY OF THE INVENTION

Accordingly, one object of the present invention is to provide a novel position sensor for converting a mechanical displacement into an electrical signal and detecting an amount of the displacement of a movable member by means of a non-contacting mechanical-to-electrical conversion mechanism.

It is another object of the present invention to provide a novel position sensor for exactly detecting a displacement of a movable member by use of a simple electrical signal processing system and simple read-out logic using a large scale integrated circuit.

It is a further object of the present invention to provide a novel position sensor including at least a movable member, a permanent magnet, a magnetically soft material, and an electrical coil wound around the magnetically soft material so that an amount of the movable member's displacement may be easily and exactly detected.

Before describing preferred embodiments of the present invention, a general discussion concerning the application of amorphous magnetic materials in the present invention is provided hereinafter to assist in understanding objects, features and the construction of the present invention.

In the following, "T" represents a time necessary to magnetically saturate a magnetically soft material around which an electrical coil is wound from the time when electric power is applied to the coil.

$$T = (N/E)(\phi_m - \phi_x) \quad (1)$$

wherein

E: Voltage applied to an electric coil
N: The number of turns in the coil
$\phi_m$: Maximum magnetic flux (approximately identical to saturation magnetic flux)
$\phi_x$: Magnetic flux due to an external magnetic field It is apparent from the above formula that T will change when $\phi_x$ varies in response to a displacement of the movable member.

In this manner, as the permanent magnet is displaced in response to a displacement of the movable part attached thereto to cause a change in the external flux $\phi_x$ applied to the magnetically soft member, after the application of a voltage to the coil, T will change until the coil current reaches a given level.

Accordingly, in the position sensor according to the invention, an electrical circuit or a semiconductor electronic device can be used to determine the value of T and provide an electrical signal in the form of a voltage level or a digital code indicating such value. An amorphous magnetic material is used to form the magnetically soft member. However, since an amorphous magnetic member must be manufactured by quenching a liquid phase metal material, it is always formed as a thin sheet. It exhibits a ferromagnetism and has a high level of magnetic saturation, high permeability ($u_{max} > 10^3$), and a low level of a coercive force ($< 1.0$ Oe) while exhibiting a very high breaking strength and an excellent resiliency and stability. Such properties of the amorphous material are preferred for use in the position sensor of this invention. Its use advantageously facilitates signal processing and increases accuracy in the determination of the value of T. In addition, in mechanical aspects, the manufacturing is simplified while improving the resistance to oscillations or shocks. Some magnetically soft materials are described in Hasegawa et al. "Soft Magnetic Properties of Metallic Glasses—Recent Developments," J. Appl. Phys. 50(3), March, 1979, pp. 1551–1556. Magnetically soft materials are sold under the trademark METGLAS TM by Allied Chemical Corp.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein:

FIG. 2b is a graph which shows the waveforms of input and output signals, respectively, to and from the processing circuit shown in FIG. 2a;

FIG. 3b is a graph which illustrates the waveform of input and output signals, respectively, to and from the processing circuit shown in FIG. 3a;

FIG. 6b is a graph which shows voltage data indicative of the time lag which varies in accordance with the travel y of a 10 mm long permanent magnet in the Y—Y direction utilizing the arrangement illustrated in FIG. 6a when the electrical coil is connected to the electrical processing circuit shown in FIG. 2a, in the case that the voltage pulses applied to the electrical coil are such that S-pole is produced at the upper end of the magnetically soft member as viewed in FIG. 6a;

FIG. 6c is a graph which shows a data for a 30 mm long permanent magnet, which corresponds to the data in FIG. 6b;

FIG. 6d is a graph which shows data for a 30 mm long permanent magnet corresponding to that shown in FIG. 6b when voltage pulses are applied to the electrical coil with a polarity such that an N-pole is produced at the upper end of the magnetically soft member as viewed in FIG. 6a;

FIG. 7a is a longitudinal cross-sectional view of a position sensor according to another embodiment of the invention;

FIG. 7b is a side view of a position sensor shown in FIG. 7a;

FIG. 7c is a cross-sectional view taken along a line B—B in FIG. 7b;

FIG. 7d is a cross-sectional view taken along a line A—A in FIG. 7a;

FIG. 8 is a graph which shows voltage data indicative of the time lag which varies in accordance with the travel x of a 10 mm long permanent magnet in the X—X direction utilizing the arrangement shown in FIG. 6a with the electrical coil connected to the electrical processing circuit shown in FIG. 2a, voltage pulses being applied to the electrical coil with a polarity such that an S-pole is produced at the upper end of the magnetically soft member, as viewed in FIG. 6a;

FIG. 8b is a graph which shows the time lag data when the coil is connected to the electrical processing circuit shown in FIG. 3a, with input and output pulses being applied to a synchroscope, utilizing the arrangement shown in FIG. 6a and moving the permanent magnet in the X—X direction, voltage pulses applied to the electrical coil being such that an S-pole is produced at the upper end of the magnetically soft member, as viewed in FIG. 6a;

FIG. 8c is a graph which shows data corresponding to FIG. 8a when voltage pulses are applied to the electrical coil with such polarity that an N-pole is produced at the upper end of the magnetically soft member, as viewed in FIG. 6a;

FIG. 8d is a graph which shows data corresponding to FIG. 8b when voltage pulses are applied to the electrical coil with such polarity that an N-pole is produced at the upper end of the magnetically soft member, as viewed in FIG. 6a;

FIG. 8e is a graph which illustrates data corresponding to FIG. 8a when a 30 mm long permanent magnet is employed;

FIG. 8f is a graph which shows data corresponding to FIG. 8b when a 30 mm long permanent magnet is employed;

FIG. 9b is a side view of a position sensor illustrated in FIG. 9a;

FIG. 9d is a cross-sectional view taken along a line A—A in FIG. 9a;

FIG. 11b is a graph which shows voltage data indicative of a time lag which varies in accordance with the travel x of a 30 mm long permanent magnet in the X—X direction, utilizing the arrangement shown in FIG. 11a and a pair of electrical coils spaced apart by 35 mm and connected to the electrical processing circuit shown in FIG. 10, voltage pulses being applied to the electrical coils with a polarity such that an S-pole is produced at the upper end of the respective magnetically soft members, as viewed in FIG. 11a;

FIG. 11c is a graph which shows data corresponding to FIG. 11a when voltage pulses are applied to the electrical coils with polarity such that an N-pole is produced at the upper end of the respective magnetically soft members, as viewed in FIG. 11a;

DESCRIPTION OF THE PREFERRED EMBODIMENTS

Figure 1:
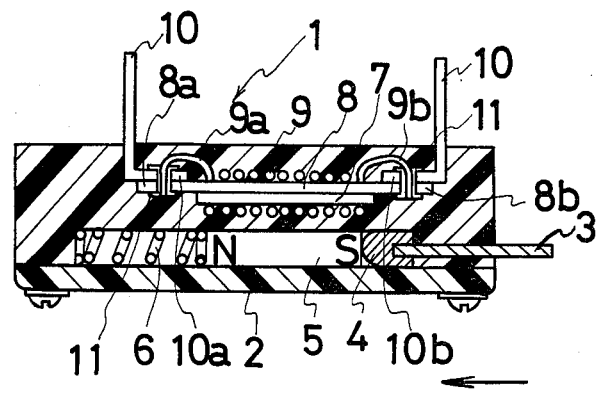
FIG. 1 is a longitudinal cross-sectional view of a position sensor according to one embodiment of the invention.

Referring now to the drawings, wherein like reference numerals designate identical or corresponding parts throughout the several views, and more particularly to FIG. 1 thereof, a position sensor 1 according to the invention is seen to include a housing 2 within which a permanent magnet 5 is located in abutment with a connecting member 4. A movable member 3 is secured at one end thereof to the connecting member 4 and another end of the member 3 is projected outwardly so as to move the permanent magnet 5 in the direction indicated by the arrow when the movable member 3 is displaced by an external force applied to the outwardly projected portion of the movable member. The permanent magnet 5 is spring biased by a spring 6 which serves to restore the permanent magnet 5 to the original position thereof when the external force is released. A magnetically soft member 7 is arranged in parallel to the permanent magnet 5 and in spaced relationship therewith. A synthetic resin guard 8 which is attached to the magnetically soft member 7 prevents deformation of the magnetically soft member 7. Around the arrangement of the member 7 and the guard 8, a coil 9 is wound, of which one end 9a and one end 8a of the guard 8 are fixed to one end 19a of a terminal 10 by means of rivets 11, respectively, and other ends 9b, 8b thereof are also fixed to another end 10b of the terminal 10 in the same manner as above. In this arrangement, when the movable member 3 and the permanent magnet 5 are forced to move in the direction indicated by the arrow in FIG. 1, the magnetically soft member 7 detects such displacement of the movable member 3 and functions to convert the same into an electrical signal. The displacement of the permanent magnet 5 is determined by an electrical processing circuit and/or as logic processing electronic means.

Figure 2A:
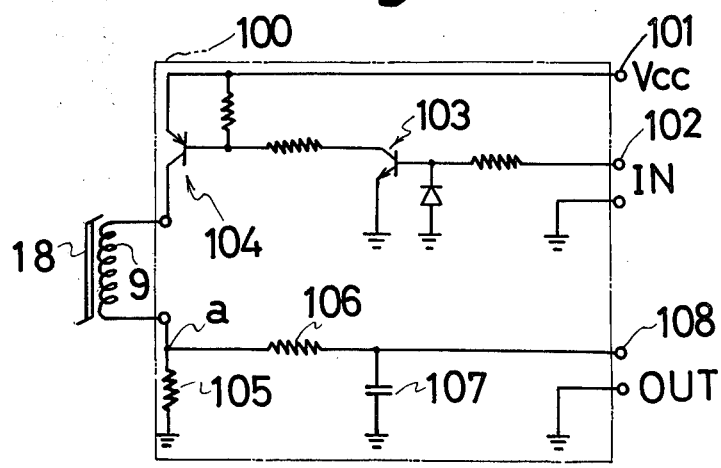
FIG. 2a is a circuit diagram of an electrical processing circuit connected to the position sensor shown in FIG. 1 for producing an analog voltage signal of a level which corresponds to the displacement detected.

FIG. 2a shows one form of electrical processing circuit 100. The circuit 100 includes a terminal 101 adapted to be connected with a given D.C. supply voltage, Vcc, on the order of +5 V, for example. The circuit also includes an input terminal 102, to which voltage pulses having a frequency for example on the order of 5–25 KHz are applied. A NPN transistor 103 which has its base connected to the terminal 102 is rendered conductive during the time that the voltage pulses remain positive, and is rendered nonconductive when the voltage pulses assume a ground level. A PNP transistor 104 is turned on and off when the transistor 103 is turned on and off, respectively. Hence, the supply voltage (Vcc) is applied to the electrical coil 9 during the time the voltage pulses applied to the input terminal 102 remain positive, while no voltage is applied thereto during the time the voltage pulses remain at the ground level. A voltage proportional to current flowing through the coil 9 is generated at a resistor 105, and is integrated by an integrator having a resistor 106 and a capacitor 107, so that the integrated voltage appears at an output terminal 108.

Figure 2B:
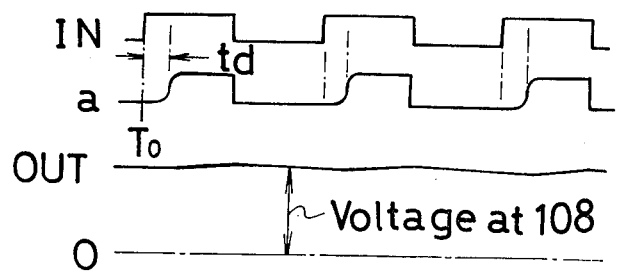

FIG. 2b graphically shows the waveforms of the input and the output voltages of the circuit shown in FIG. 2a. The time lag $t_d$ from the rising edge of the input voltage (IN) until the voltage across the resistor 105 exceeds a given level, as well as the integrated voltage Vx, which represents an integral of the voltage across the resistor 105, both depend on the location of the permanent magnet 5.

Figure 3A:
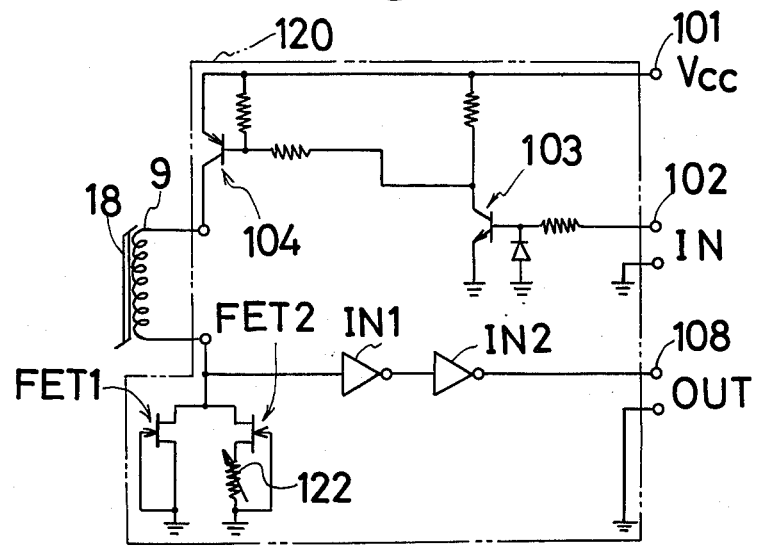
FIG. 3a is a circuit diagram of another electrical processing circuit connected to the position sensor shown in FIG. 1 for deriving pulses indicative of a time lag corresponding to the displacement detected.

FIG. 3a illustrates another electrical processing circuit 120. In this instance, NPN transistor 103 and PNP transistor 104 are turned on during the time when the input voltage (IN) remains positive, thus enabling the application of supply voltage Vcc to the coil 9. During the time the input voltage (IN) assumes the ground level, the transistors 103 and 104 are turned off. A pair of junction N-channel field effect transistors FET 1 and FET 1 together form a constant current source and maintain a constant current flow through the coil. The current level through FET 2 can be adjusted by means of a variable resistor 122. The voltage developed at the terminal of the coil which is connected to FET 1 and FET 2 is fed to a pair of inverting amplifiers IN 1 and IN 2, which amplify and shape this voltage.

Figure 3B:
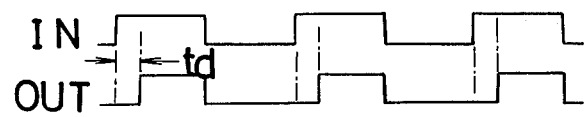

FIG. 3b graphically shows the waveforms of input and output voltages of the circuit of FIG. 3a. The circuit 102 produces output voltages pulses (OUT) delayed by a time lag $t_d$ with respect to respective input pulses (IN), and the magnitude of time lag depends on the location of the permanent magnet 5.

Figure 4:
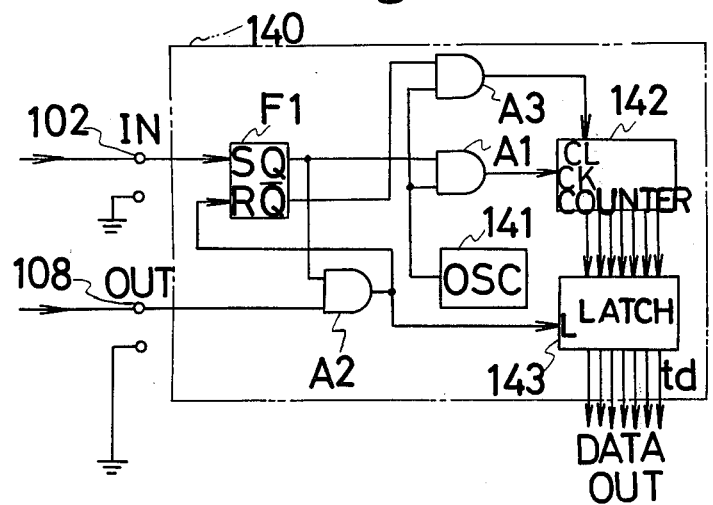
FIG. 4 is a block diagram of a counter circuit which converts a time lag between input and output pulses from the processing circuit of FIG. 3a into a digital code.

FIG. 4 shows a counter circuit 140 which converts the magnitude of $t_d$ into a corresponding digital code. In the circuit of FIG. 4, the rising edge of an input voltage (IN) sets a flip-flop F1, whereby its Q output changes to a high level "1", which enables an AND gate A1 to pass a pulse produced by a clock pulse oscillator 141 to a count pulse input CK of a counter 142. An output pulse (OUT) and the Q output of the flip-flop F1 are applied to an AND gate A2, which produces a high level "1" when the output pulse (OUT) rises to a high level. At this point in time, the flip-flop F1 is reset, with its Q output reverting to a low level "0". This disables the AND gate A1, and hence the supply of a clock pulse to the counter 142 is interrupted. At the time when the AND gate A2 produces a "1" output, a code indicative of the count in the counter 142 is stored in a latch 143. After the flip-flop F1 is reset and the latch 143 has been loaded with the count code, an AND gate A3 passes clock pulses to clear the counter 142. An output code from the latch 143 indicates the number of clock pulses passed during the time interval of $t_d$, and hence represents the magnitude of $t_d$.

Figure 5:
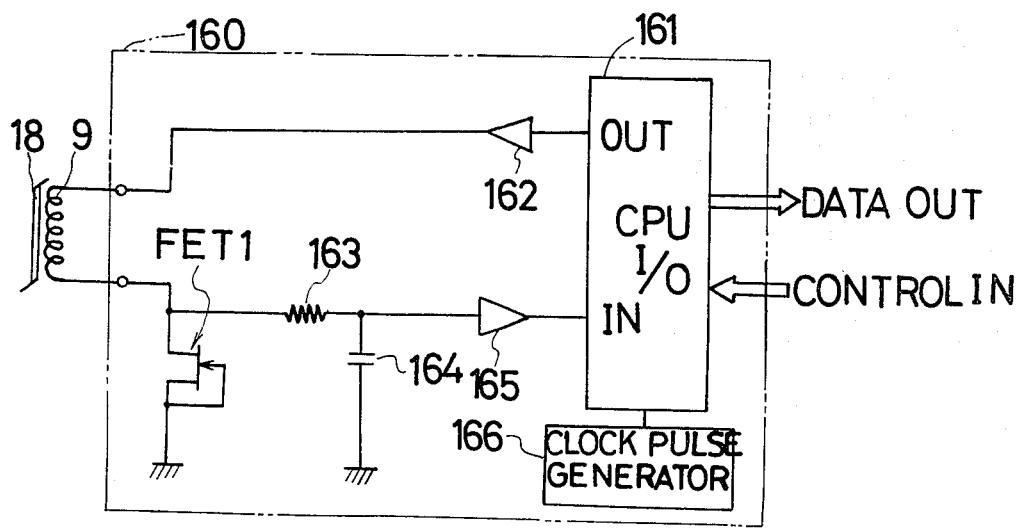
FIG. 5 is a block diagram of an electronic processing unit connected to the position sensor shown in FIG. 1 for determining a time lag from the time of application of input voltage pulses to the electrical coil until the rising edge of a current flow across the electrical coil of the position sensor, the voltage pulses being applied from a single chip microcomputer.

An electronic processing unit 160 shown in FIG. 5 comprises a single chip microcomputer (a large scale integrated semiconductor unit) 161, an amplifier 162, a junction N-channel field effect transistor FET 1 which acts as a constant current source, a resistor 163, a capacitor 164, an amplifier 165 and a clock pulse oscillator 166. The combination of the resistor 163 and the capacitor 164 forms a filter which eliminates the effect of voltage oscillations of frequencies higher than the frequency of the input and the output pulses. The microcomputer 161 forms pulses of a given frequency in a range from 5 to 30 KHz based on the clock pulses generated by the clock pulse generator 166, and feeds these pulses to the amplifier 162. On the other hand, the microcomputer 161 monitors the voltage developed at the junction between the N-channel FET 1 and one end of the coil, or the output voltage of the amplifier 165, and counts the clock pulses which are developed during the time from the rising edge of the pulse outputted by itself until the output voltage of the amplifier 165 rises to a given level. Such time interval corresponds to $t_d$, and the microcomputer forms an output code indicative of the value of $t_d$ (DATA OUT).

As discussed above, the pressure sensor 1 of FIG. 1 may be connected to a variety of electrical processing circuits or an electronic logical processing unit to provide an electrical signal indicative of the location of the permanent magnet 5 within the pressure sensor 1. The use of the position sensor 1 shown in FIG. 1 in combination with one of the electrical processing circuits 100, 120, 140 or the logical processing unit 160 to derive an electrical signal indicative of the displacement of the movable member 3 will now be described.

Figure 6A:
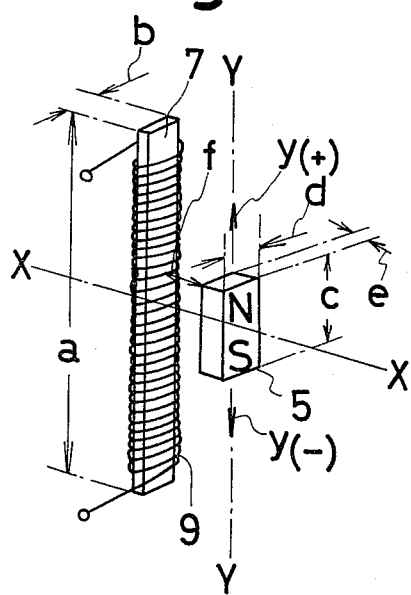
FIG. 6a is a perspective view illustrating the relative position of a magnetically soft member and a permanent magnet, which arrangement is used in determining a time lag which varies in accordance with the relative location of the permanent magnet to the magnetically soft member.

The conversion of the location of the permanent magnet 5 into an electrical signal will now be described with reference to experimental data shown in FIGS. 6b to 6d. In these experiments, the inventor has fixedly mounted the magnetically soft member 7 on a table as shown in FIG. 6a, and placed the permanent magnet 5 in parallel relationship therewith. An X—X axis is chosen so as to pass traversely through the longitudinal center of the magnetically soft member 7 in a direction perpendicular to the length thereof. A point in the permanent magnet 5 which is located on the X—X axis is chosen as the origin of a Y—Y axis which is perpendicular to the X—X axis. Then the values Vx and $t_d$ have been measured as an index of the travel y of the permanent magnet 5 in the Y—Y direction. The specific values of various parameters, and the material of the magnetically soft or soft magnetic member as well as data obtained, are indicated in the Table 1 below as listed in Cases No. 1 to 3.

TABLE 1

| Case No. | Magnetically soft member 7 | | | | Coil 9 |
|---|---|---|---|---|---|
| | Material Atomic Weight % | Thickness mm | a mm | b mm | Number of sheets | Number of turns |
| 1 | $Fe_{40}Ni_{38}Mo_4B_{18}$ Amorphous | 0.050 | 40 | 1.8 | 5 | 1000 |
| 2 | $Fe_{40}Ni_{38}Mo_4B_{18}$ Amorphous | " | " | " | " | " |
| 3 | $Fe_{40}Ni_{38}Mo_4B_{18}$ Amorphous | " | " | " | " | " |
| 4 | $Fe_{40}Ni_{38}Mo_4B_{18}$ Amorphous | " | " | " | " | " |
| 5 | $Fe_{40}Ni_{38}Mo_4B_{18}$ Amorphous | " | " | " | " | " |
| 6 | $Fe_{40}Ni_{38}Mo_4B_{18}$ Amorphous | " | " | " | " | " |
| 7 | $Fe_{40}Ni_{38}Mo_4B_{18}$ Amorphous | " | " | " | " | " |
| 8 | $Fe_{40}Ni_{38}Mo_4B_{18}$ Amorphous | " | " | " | " | " |
| 9 | $Fe_{40}Ni_{38}Mo_4B_{18}$ Amorphous | " | " | " | " | " |
| 14 | $Fe_{40}Ni_{40}P_{14}B_6$ Amorphous | 0.058 | 40 | 1.8 | 5 | 1000 |
| 15 | $Fe_{40}Ni_{40}P_{14}B_6$ Amorphous | " | " | " | " | " |
| 16 | $Ni_{80}Fe_{16}Mo_4$ Mu-metal | 0.200 | 40 | 5 | 2 | 1000 |
| 17 | $Ni_{80}Fe_{16}Mo_4$ Mu-metal | " | " | " | " | " |
| 18 | $Ni_{80}Fe_{20}$ Supermalloy | 0.100 | 40 | 5 | 2 | 1000 |
| 19 | $Ni_{80}Fe_{20}$ Supermalloy | " | " | " | " | " |

Figure 6B:
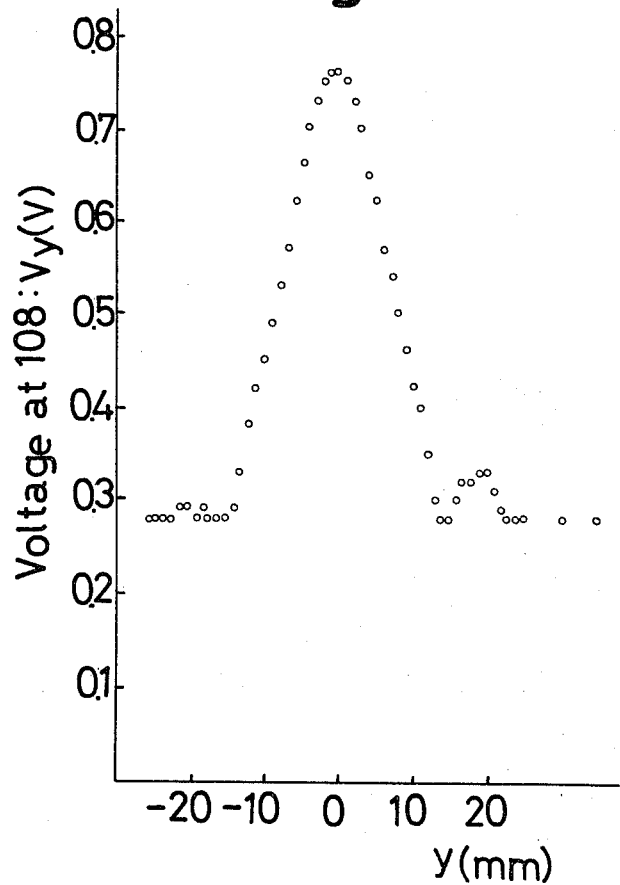
Figure 8A:
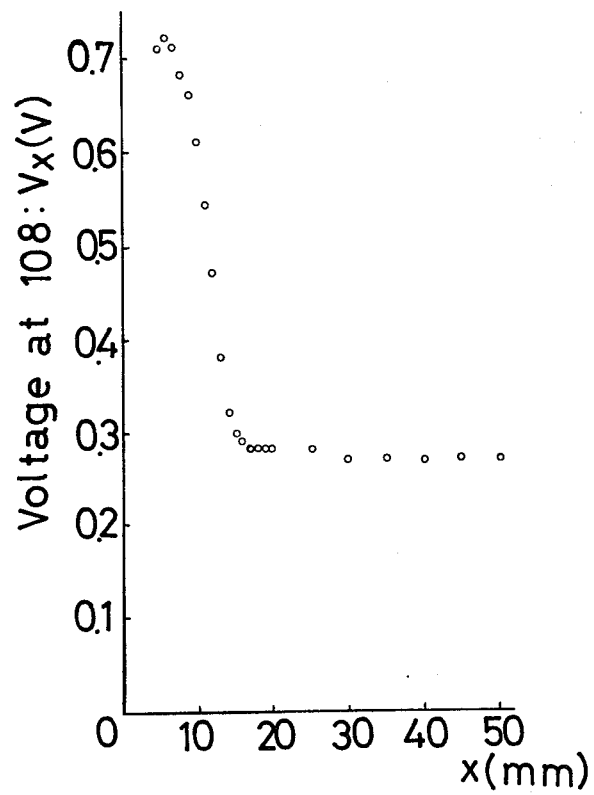
Figure 8B:
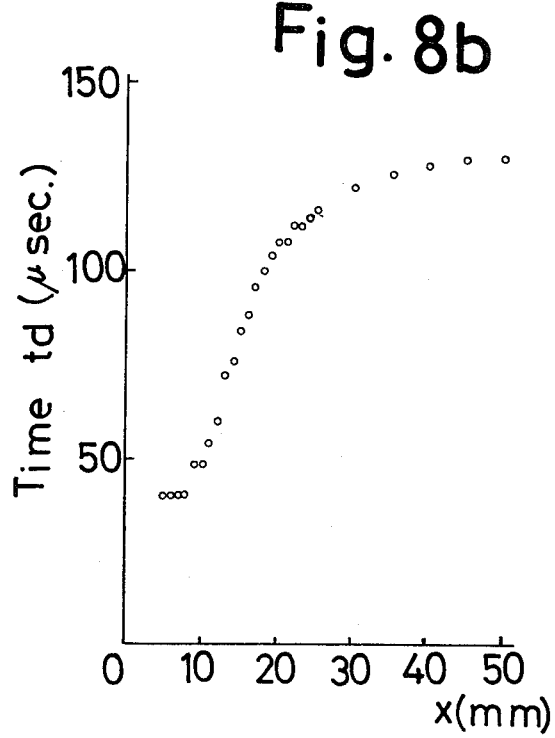
Figure 8D:
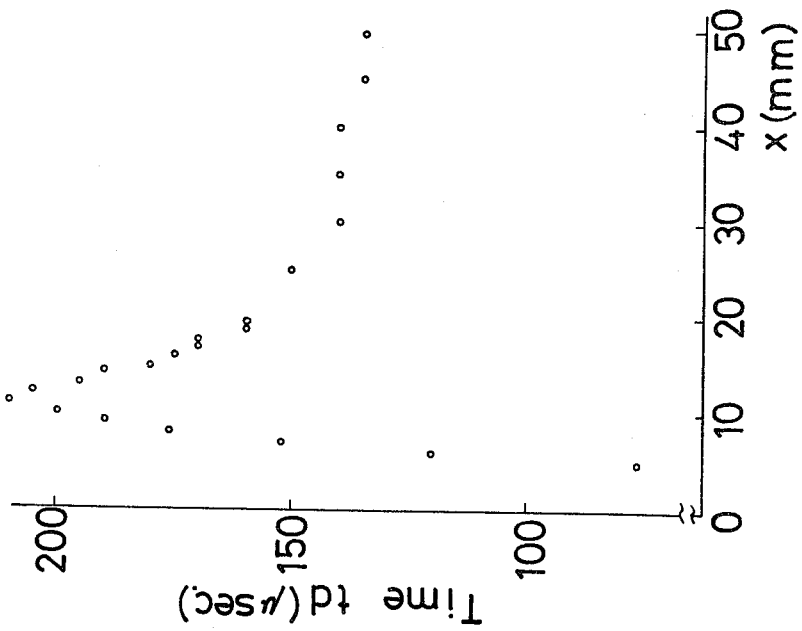
Figure 8C:
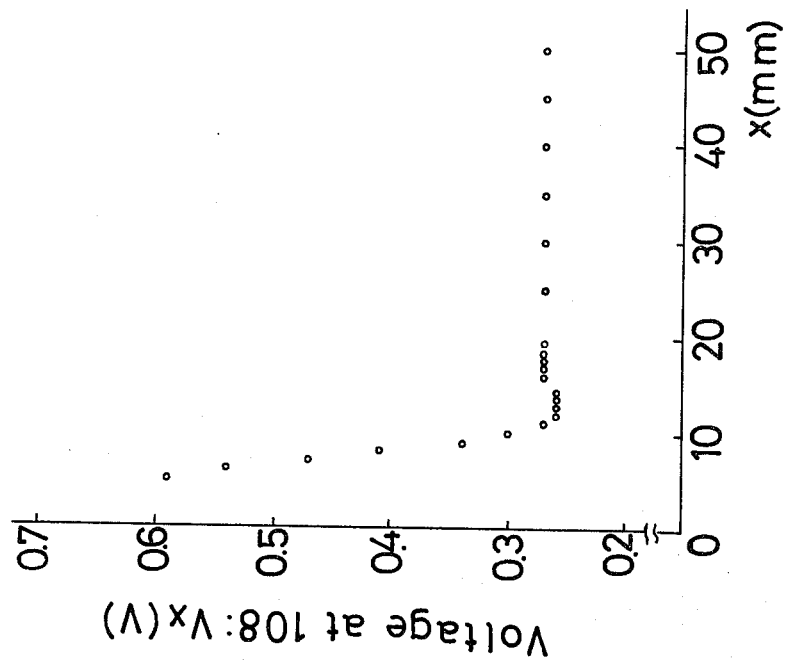
Figure 9A:
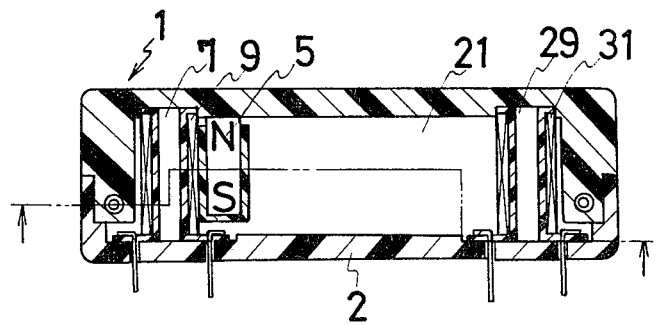
FIG. 9a is a longitudinal cross-sectional view of a position sensor according to a further embodiment of the invention.
Figure 9B:
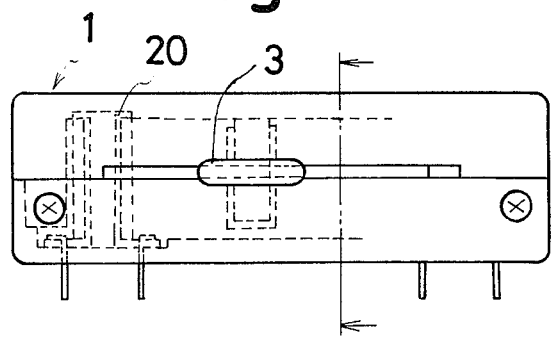
Figure 9C:
FIG. 9c is a cross-sectional view taken along a line B—B in FIG. 9b.

| Case No. | Permanent magnet 5 | | | Spacing f mm | Measuring means and frequency of input pulses | Voltage polarity* | Data |
|---|---|---|---|---|---|---|---|
| | c mm | d mm | e mm | | | | |
| 1 | 10 | 5 | 4 | 5 | Circuit 100 5 KHz | S-N | FIG. 6b |
| 2 | 30 | " | " | " | Circuit 100 5 KHz | " | FIG. 6c |
| 3 | 30 | " | " | " | Circuit 100 5 KHz | N-N | FIG. 6d |
| 4 | 10 | " | " | x | Circuit 100 5 KHz | S-N | FIG. 8a |
| 5 | 10 | " | " | x | Circuit 120 & Synchroscope 5 KHz | S-N | FIG. 8b |
| 6 | 10 | " | " | x | Circuit 100 5 KHz | N-N | FIG. 8c |
| 7 | 10 | " | " | x | Circuit 120 & Synchroscope 5 KHz | N-N | FIG. 8d |
| 8 | 30 | " | " | x | Circuit 120 & Synchroscope 5 KHz | S-N | FIG. 8e |
| 9 | 30 | " | " | x | Circuit 120 & Synchroscope 5 KHz | N-N | FIG. 8f |
| 14 | 30 | 5 | 4 | x | Circuit 100 | S-N | FIG. 15 A1 |
| 15 | " | " | " | x | Circuit 100 | N-N | FIG. 15 A2 |
| 16 | 30 | 5 | 4 | x | Circuit 100 5 KHz | S-N | FIG. 15 B1 |
| 17 | " | " | " | x | Circuit 100 5 KHz | N-N | FIG. 15 B2 |
| 18 | " | " | " | x | Circuit 100 | S-N | FIG. 15 |

TABLE 1-continued

| | | | | | | | |
|---|---|---|---|---|---|---|---|
| 19 | " | " | " | x | 5 KHz Circuit 100 5 KHz | N-N | C1 FIG. 15 C2 |

In the above table, under the column labeled "Voltage Polarity", the indication "S-N" under the column of voltage polarity means that the connection of a coil 9 with the electrical circuit 100 or 120 is such that an S-pole is produced at the upper end of the magnetically soft member 18. Similarly, the indication "N—N" means that the coil 9 is connected to the electrical circuit 100 or 120 in a manner such that an N-pole is produced at the upper end of the magnetically soft member.

In Case No. 1, it is seen from data shown in FIG. 6b that a voltage Vy of a very high accuracy can be obtained for the travel y of the magnet from 0 mm to +14 mm or from −1 mm to −15 mm, or preferably from −2 mm to +12 mm or from −3 mm to −13 mm in the Y—Y axis direction. It is also seen that in Case No. 3, voltage Vy of a high accuracy is obtained for the travel y of the magnet over an increased range as compared with Case No. 1. In Case No. 2, the range having a good linearity is relatively limited in extent, but the voltage is distributed in various areas of y. Hence, an operating range for the magnet 5 is chosen in the position sensor 1 of FIG. 1 so that the voltage Vy exhibits a good linearity with respect to the travel or location y of the magnet 5.

Referring next to FIG. 7a to 7d, there is shown a position sensor 1 according to another embodiment of the present invention. A housing 2 has a chamber 21 therein in which a permanent magnet 5 and a magnetically soft member 7 are disposed in parallel relationship. The permanent magnet 5 is provided with a movable member 3 and the magnetically soft material 7 is provided at an outer surface thereof with a bobbin 20 around which an electrical coil 9 is wound. One end 20a of the bobbin 20 is fixed to one end 10a of the coil 9 and the terminal 10, respectively, by soldering. A part of the movable member 3 is projected outwardly of the housing 2. When the movable member 3 is moved, the permanent magnet 45 is also displaced depending on the amount of the movable member's movement so as to derive the electrical signal from the magnetically soft member 7. In this embodiment, the permanent magnet 5 is moved along the X—X axis shown in FIG. 6a with respect to the soft magnetic member 7.

Experimental data obtained by a movement of the permanent magnet 5 in this manner is illustrated in FIGS. 8a to 8f. Various parameters such as the configuration, the size and disposition of the associated parts utilized to obtain the data illustrated in FIGS. 8a to 8f are indicated by Cases No. 4–9 in Table 1. It will be seen from the data illustrated in FIGS. 8a to 8f that when the permanent magnet 5 is driven for movement in the direction of the X—X direction, the range of the voltage Vx or time lag $t_d$ as a function of the travel x of the magnet 5 which has a good linearity is relatively limited. However, since the magnitude of change is great in such limited range, a design can be made so that the permanent magnet 5 moves through such limited range.

In FIGS. 9a to 9d is shown a position sensor according to another embodiment of the present invention. The illustrated embodiment is substantially similar in structure to the embodiment shown in FIGS. 7a to 7d except that two soft magnetic members 7 are disposed within the chamber 21 of the housing 2 in spaced relationship to each other.

Figure 10A:
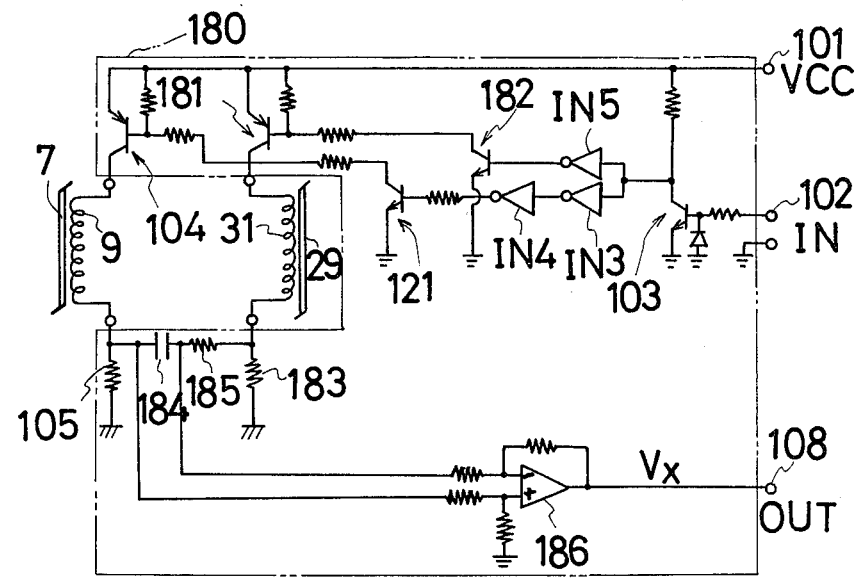
FIG. 10a is a circuit diagram of an electrical processing circuit connected to the position sensor shown in FIG. 9 for producing an analog voltage of a level which depends on the displacement detected.

FIG. 10a shows an electrical processing circuit 180 which produces an analog voltage Vx in accordance with the location of the permanent magnet 5 in the position sensor 1 shown in FIGS. 9a to 9d. Specifically referring to the circuit 180, an NPN transistor 103 is turned on during the time input voltage pulses (IN) remain at a positive level, and is turned off during the time the input voltage pulses assume a ground level. The collector voltage of the transistor 103 is amplified and shaped by a pair of inverting amplifiers IN3 and IN4 before it is applied to the base of an NPN transistor 121. Thus, when the input voltage pulses (IN) assume a positive level, the transistor 103 is turned on while the transistor 121 is turned off. Consequently, a PNP transistor 104 is turned off during such time interval. While the transistor 103 is off, the transistor 121 is on and the transistor 104 is on during the time the input voltage pulses assume the ground level. In other words, voltage pulses are applied to the coil 22 in a similar manner as in the circuit 120 of FIG. 3a, whereby voltage pulses appear across a resistor 105 with a time lag $t_{d1}$ from the falling end of the input voltage pulses (IN) in a manner corresponding to the distance $x_1$ of the permanent magnet 5 from the magnetically soft member 7. A constant voltage is applied to another electrical coil 31 through a PNP transistor 181. Since the transistor 103 is turned on to cause an inverting amplifier IN5 to produce a positive output which in turn turns an NPN transistor 182 on during the time the input voltage pulses (IN) assume its positive level, the transistor 181 is also turned on, while the latter is turned off when the input voltage pulses (IN) assume a ground level. As a result, a constant supply voltage Vcc is applied to the second coil when no voltage is applied to the first coil 9 while no supply voltage is applied to the second coil 31 when a voltage is applied to the coil 9. Stated differently, the constant supply voltage Vcc is applied to the first and the second coils 9, 31 in alternate fashion in accordance with the input voltage pulses (IN). The second coil 31 is connected to a resistor 183, across which voltage pulses appear having rising edges which lag behind the rising edges of the input voltage pulses (IN) by a time interval of $t_{d2}$ which depends on the distance $x_2$ of the permanent magnet 5 from the magnetically soft member 7. The voltage Vx1 developed across the resistor 105 is applied to one plate of a capacitor 184, while the voltage Vx2 developed across the resistor 183 is applied to the other plate of the capacitor 184. Since the distances beween the permanent magnet 5 on one hand and the first and the second magnetically soft members 7, 29 on the other hand are represented by $x_1$ and $x_2$, respectively with $x_1+x_2=k$ (constant), and since Vx1 and Vx2 are proportional to the magnitude of X1 and X2, respectively, the potential difference across the capacitor 184 forms an integrator together with a resistor 185, thus producing a voltage thereacross which corresponds to the magnitude of $(x_1-x_2)$. Since $x_2=k-x_1$, $x_1=2x_1-k$. Thus, the voltage across the capacitor 184 corresponds to the magnitude of $2x_1$. That is, an analog voltage is obtained which corresponds to twice the travel $x_1$ of the permanent magnet 5 as referenced to the first magnetically soft member 7. The opposite ends of the capacitor 184 are connected to both inputs of an operational amplifier 186 which is designed as a differential amplifier. The amplifier 186 produces an analog output Vx which corresponds to $2x_1$.

Figure 10B:
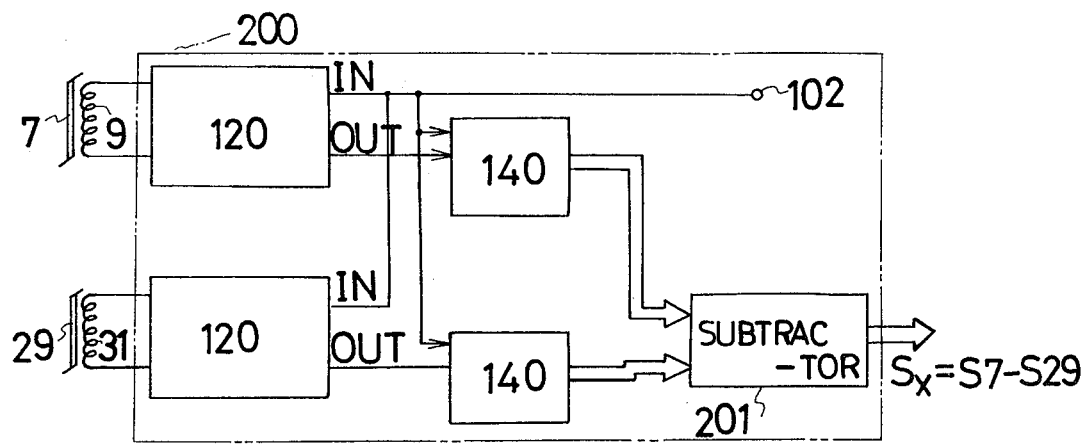
FIG. 10b is a block diagram of an electrical processing circuit connected to the position sensor shown in FIG. 9 for producing a digital code which represents the displacement detected.

FIG. 10b shows another electrical processing circuit 200 which provides a pair of pulses which lag behind the rising edge of the input pulse by time intervals of $t_{d1}$ and $t_{d2}$, respectively. These pulses are applied to a pair of counter circuits 140, respectively, where they are converted into a pair of codes S7 and S29 which represent the magnitude of $t_{d1}$ and $t_{d2}$. These codes are applied to a subtractor 201, which calculates $t_{d1} - t_{d2}$, producing a digital output code Sx = S7 − S29 which represents $t_{d1} - t_{d2}$ or $2x_1$.

Figure 10C:
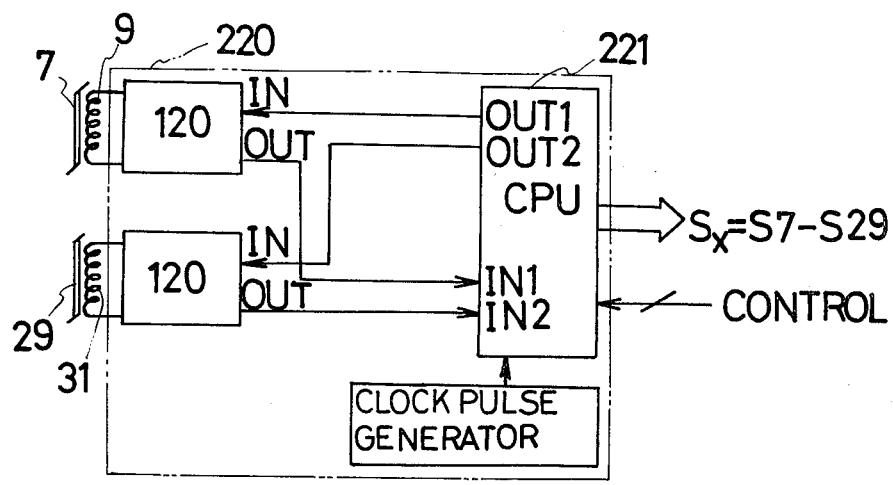
FIG. 10c is a block diagram of an electronic logical processing unit connected to the position sensor shown in FIG. 9 for producing a digital code indicative of the displacement detected.
Figure 10D:
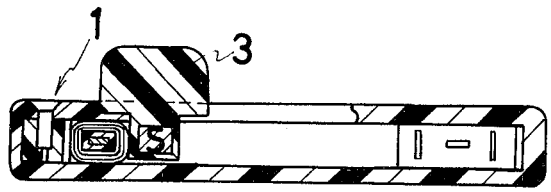

FIG. 10c illustrates an electronic logical processing unit 220 including a single chip microcomputer 221 which applies a single pulse to the circuit 120 connected to the electrical coil 9 while initiating a time counting operation from the rising edge thereof to obtain $d_{d1}$ count data S7, which is retained. Subsequently, the microcomputer applies single pulses to the circuit 120 connected to the electrical coil 31 while initiating the time counting operation from the rising edge thereof to obtain $t_{d2}$ count data S29. Then it calculates a difference $(t_{d1} - t_{d2})$, to produce a corresponding output code SX = S7 − S29. As long as a measurement command control signal is present, the microcomputer continues such operation.

Figure 11A:
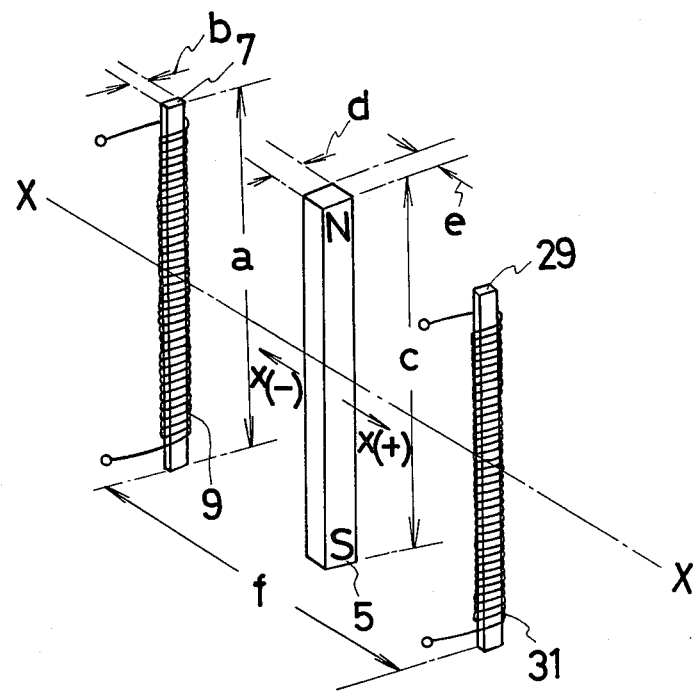
FIG. 11a is a perspective view illustrating the relative position of a pair of magnetically soft members and a permanent magnet, which arrangement is used to determine a time lag of associated electrical coils in accordance with the position of the permanent magnet relative to the members.

The inventor has measured the value of Vx as an index of the travel x of the permanent magnet 5 in the direction of the X—X axis by using an arrangement as illustrated in FIG. 11a where the magnetically soft members 7 and 29 are fixedly disposed in parallel relationship with each other with the permanent magnet 5 placed intermediate between them as so to be parallel to both members 7 and 29. An axis passing through the magnet and the members 7, 29 in a direction perpendicular to their axis is chosen as the X—X axis with the origin (x=0) chosen at the location of the magnet 5 when it is positioned midway between the members 7, 29. Parameters a to f including the configuration and the disposition as well as the material of the magnetically soft members are indicated in the Table 2 below in correspondence to the associated measured data.

TABLE 2

| Case No. | Material, Atomic Weight Percent | Magnetically soft member 7, 29 | | | | Coil 9, 31 |
|---|---|---|---|---|---|---|
| | | Thickness mm | a mm | b mm | Number of sheets | Number of turns |
| 10 | $Fe_{40} Ni_{40} Mo_2 B_{18}$ Amorphous | 0.05 | 30 | 1.8 | 4 | 1000 |
| 11 | $Fe_{40} Ni_{40} Mo_2 B_{18}$ Amorphous | " | " | " | " | " |
| 12 | $Fe_{40} Ni_{40} Mo_2 B_{18}$ Amorphous | " | " | " | " | " |
| 13 | $Fe_{40} Ni_{40} Mo_2 B_{18}$ Amorphous | " | " | " | " | " |

Figure 11B:
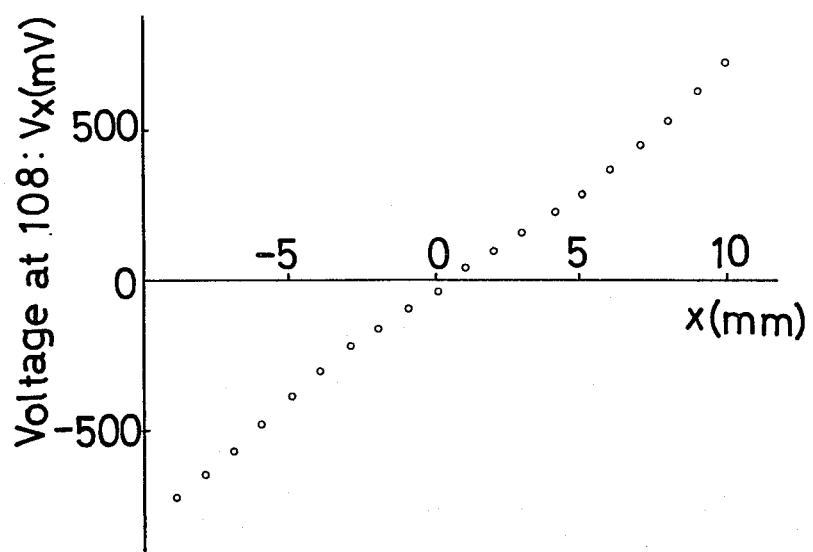
Figure 11C:
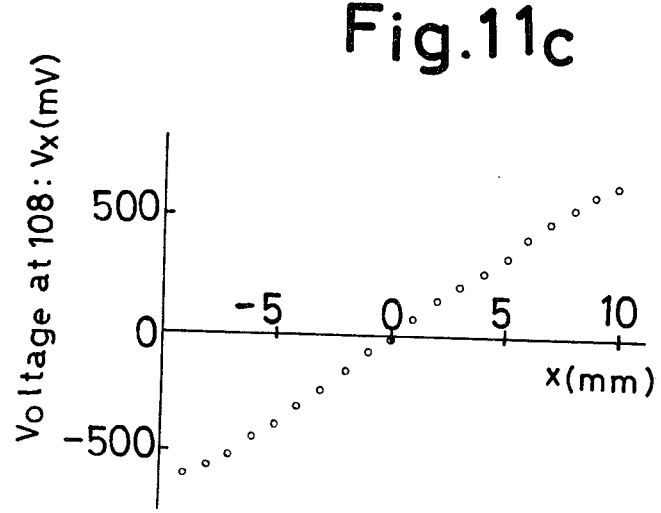
Figure 11D:
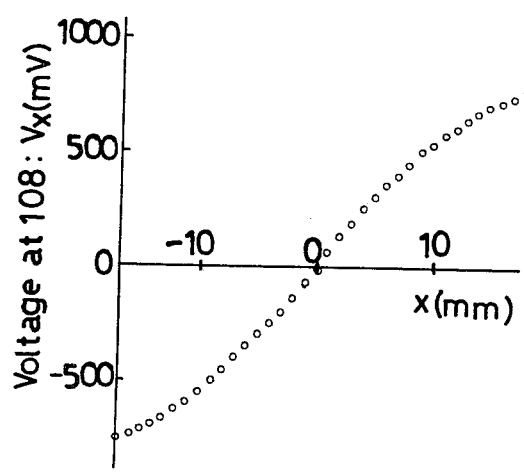
FIG. 11d is a graph which presents data corresponding to FIG. 11b when the electrical coils are spaced apart by a distance of 50 mm.
Figure 11E:
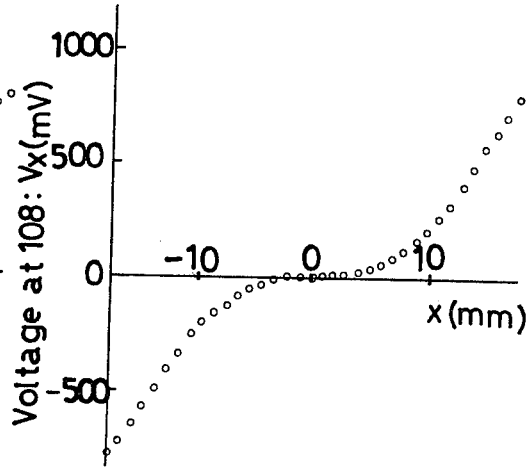
FIG. 11e is a graph which shows data corresponding to FIG. 11c when the electrical coils are spaced apart by a distance of 50 mm.

| Case No. | Permanent magnet 5 | | | Spacing f mm | Measuring means and frequency of input pulses | Voltage polarity | Data |
|---|---|---|---|---|---|---|---|
| | c mm | d mm | e mm | | | | |
| 10 | 30 | 5 | 4 | 35 | Circuit 180 5 KHz | S-N | FIG. 11b |
| 11 | " | " | " | 35 | Circuit 180 5 KHz | N-N | FIG. 11c |
| 12 | " | " | " | 50 | Circuit 180 5KHz | S-N | FIG. 11d |
| 13 | " | " | " | 50 | Circuit 180 5 KHz | N-N | FIG. 11e |

When the distance between the magnetically soft members 7 and 29 is small, a V(x) response characteristic having a good linearity with respect to the distance is obtained in a range of $-10$ mm $< x <$ 10 mm, as indicated in FIGS. 11b and 11c. For an increased distance f between the members 7 and 29, a relatively good linearity is achieved in a range of $-9$ mm $< x <$ 9 mm in an S-N mode as illustrated in FIG. 11d, but the extent over which the good linearity is achieved is narrower than that obtained with a reduced value of f. Also, the linearity is degraded as compared with that obtained with a smaller value of f. As shown in FIG. 11e, the linearity is very poor in a region adjacent to the origin (x=0) in an N-N mode while the linearity is improved when one of the magnetically soft members is approached, the linearity becoming very close to that of Cases No. 4–9. This is because the magnetic field which the permanent magnet 5 exerts upon the magnetically soft members 7 and 29 is reduced when the magnet is located adjacent to the origin. Thus, since the V(x) response depends not only on the distance f between the magnetically soft members 7 and 29 but also on the configuration of the permanent magnet 5 and the field strength produced thereby, a desired response can be obtained in a relatively simple manner.

Figure 12:
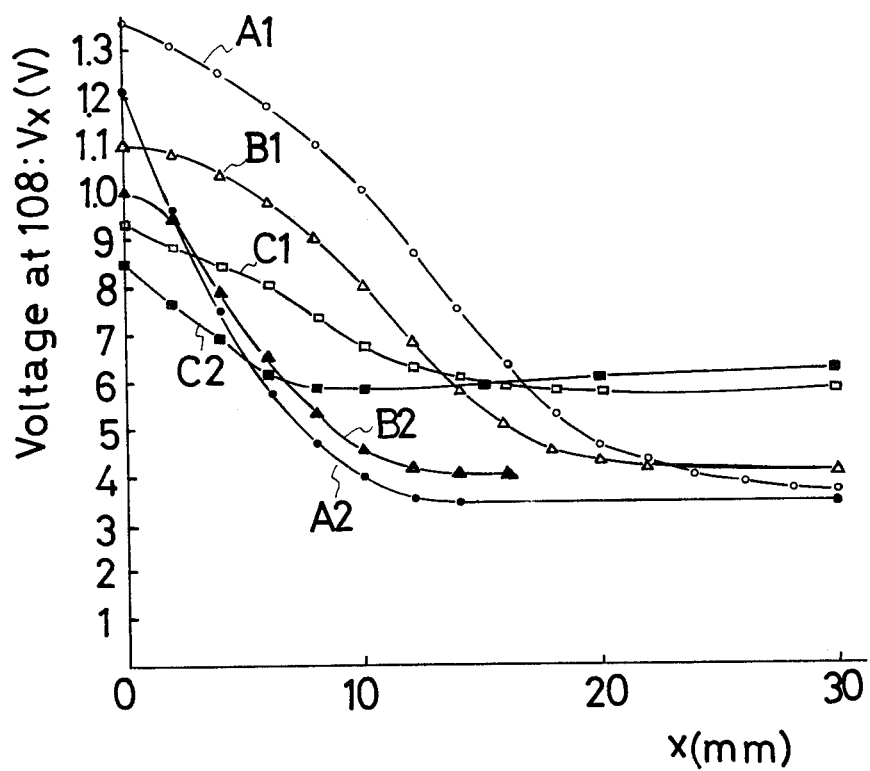
FIG. 12 is a graph which illustrates the relationship between the voltage data indicative of the time lag derived from the electrical processing circuit shown in FIG. 2a and the displacement x of the permanent magnet in the X—X direction in the array shown in FIG. 6a of various magnetically soft members.

In the described embodiments and modifications, each of the magnetically soft members 7 and 29 comprises a plurality of sheets of an amorphous magnetic material which exhibits a high resilience and a high resistance to deformation. However, other magnetic materials may be used for the magnetically soft members 7 and 29 in carrying out the invention. FIG. 12 graphically illustrates the V(x) data, representing a comparison between the use of an amorphous magnetic material and other magnetic materials. To obtain these data, the magnetically soft member and the permanent magnet area arranged as shown in FIG. 6a and the permanent magnet is driven in the direction of the X—X axis. Various parameters such as the configuration and the disposition of the parts are indicated in the Table 1 as Cases No. 14–19. Curves A1–C2 of FIG. 12 demonstrate that either magnetically soft member exhibits a high linearity in the V(x) response over a range of at least 6 mm (for example, from x=10 mm to x=16 mm for curve A, and from x=8 mm to x=14 mm for curve B1), and hence can be used in the position sensor of the invention. A magnetically soft member formed of an amorphous material is preferably used for applications which require a high resistance to oscillations and to deformation.

It will be apparent from the above description of several embodiments and demonstrations of experimental data that the position sensor of the invention does not employ a sliding contact, but converts a displacement of a movable member into a time lag $t_d$ between input pulses to an electrical coil and current pulses through the coil. The time lag $t_d$ is then converted into an analog voltage or time count code. In this manner, a position detecting signal is obtained through an electrical processing circuit, so that it is highly immune to the influence of oscillations and is less susceptible to degradation such as may be caused by mechanical abrasion. Since there is no connection mechanism between the movable body and its associated transducer, there is produced no rattling, achieving a stable position detection. Also of importance, the arrangement of the electrical processing circuit connected to the sensor is simple. In particular, a large scale semiconductor unit such as a single chip microcomputer may be used to produce detection pulses and to derive time lags between the pulses and a current pulse through the electrical coil in the form of a digital code.

Having now fully set forth both the structure and operation of preferred embodiments of the concept underlying the present invention, various other embodiments as well as certain variations and modifications of the embodiments herein shown and described will obviously occur to those skilled in the art.

What is claimed as new and desired to be secured by Letters Patent of the United States is:

1. A position sensor for detecting a displacement of an object, comprising:
   a movable member coupled to said object;
   permanent magnet means connected to said movable member for producing a magnetic field which varies in a predetermined region in dependence on the displacement of said movable member;
   core means made of a magnetically soft material and disposed in said predetermined region for forming a magnetic circuit with said magnet means;
   electric coil means including at least one coil wound around said core means for detecting a change in magnetic flux in said magnetically soft member; and
   means for detecting the displacement of said object, comprising,
   means for applying a pulse voltage to a first terminal of said coil to saturate magnetically said core means, and
   means coupled to a second terminal of said coil for producing a displacement output signal indicative of the displacement of said magnet means and therefore of said movable body based on the time between application of said pulse voltage and saturation of said core means.

2. A position sensor according to claim 1, wherein said core means consists of:
   an amorphous magnetic material.

3. A position sensor according to claim 2, further comprising:
   a synthetic resin board to which said core means is secured.

4. A position sensor according to claim 3, further comprising:
   a connecting member secured to one end of said movable member and acting to displace said permanent magnet means.

5. A position sensor according to claim 4, further comprising:
   a spring for applying a biasing force to said permanent magnet means at its other end.

6. A position sensor according to claim 1, further comprising:
   said permanent magnet means magnetized in a longitudinal direction thereof and fixed to said movable member;
   said core means comprising opposed core members each of which comprises a magnetically soft material positioned on opposite sides of said magnet means;
   said movable member undergoing displacement in a direction perpendicular to the longitudinal axis of the permanent magnet means.

7. A position sensor according to claim 1, further comprising:
   said core means having a longitudinal direction; and
   said movable member means movable in the longitudinal direction of said core means.

8. A position sensor according to claim 1, further comprising:
   said core means having a longitudinal axis; and
   said movable member means movable in a direction perpendicular to the longitudinal axis of said core means.

9. A position sensor device according to claim 1, wherein said detecting means comprises:
   constant current means for producing a constant current through said coil upon application of said pulse voltage to said first terminal of said coil.

10. A rotational angle sensor according to claim 9, wherein said constant current means comprises:
    at least one field effect transistor connected to said second terminal of said coil.

* * * * *

UNITED STATES PATENT AND TRADEMARK OFFICE
CERTIFICATE OF CORRECTION

PATENT NO. : 4,403,515

DATED : September 13, 1983

INVENTOR(S) : SHINICHIRO IWASAKI

It is certified that error appears in the above-identified patent and that said Letters Patent is hereby corrected as shown below:

In column 2, line 2, delete "$\emptyset x$" and insert thereof --$\emptyset_x$--;

In column 2, line 6, delete "$\emptyset x$" and insert thereof --$\emptyset_x$--.

In column 3, line 38, delete "FIG. 8" and insert thereof --FIG. 8a--.

In column 5, line 66, delete "FET 1" and insert thereof --FET 2--.

In column 10, line 62, delete "X1" and insert thereof --$X_1$--.

UNITED STATES PATENT AND TRADEMARK OFFICE
CERTIFICATE OF CORRECTION

PATENT NO. : 4,403,515

DATED : September 13, 1983

INVENTOR(S) : SHINICHIRO IWASAKI

It is certified that error appears in the above-identified patent and that said Letters Patent is hereby corrected as shown below:

In column 10, line 67, delete "$x_1=$" and insert thereof --$x_1-$--.

In column 13, line 6, delete "area" and insert thereof --are--.

Signed and Sealed this

Seventh Day of February 1984

[SEAL]

Attest:

GERALD J. MOSSINGHOFF

Attesting Officer

Commissioner of Patents and Trademarks